United States Patent
Pal et al.

(10) Patent No.: US 9,015,790 B2
(45) Date of Patent: Apr. 21, 2015

(54) INTEGRATING SUDO RULES WITH ENTITIES REPRESENTED IN AN LDAP DIRECTORY

(75) Inventors: Dmitri V. Pal, Framingham, MA (US); Sumit Bose, Brandenburg (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/187,455

(22) Filed: Jul. 20, 2011

(65) Prior Publication Data
US 2013/0024907 A1 Jan. 24, 2013

(51) Int. Cl.
G06F 17/00 (2006.01)
G06F 21/62 (2013.01)
G06F 21/60 (2013.01)
H04L 29/06 (2006.01)

(52) U.S. Cl.
CPC .......... G06F 21/6218 (2013.01); G06F 21/604 (2013.01); H04L 63/0884 (2013.01)

(58) Field of Classification Search
CPC .................................................. G06F 21/604
USPC ............................................................ 726/1
See application file for complete search history.

(56) References Cited

U.S. PATENT DOCUMENTS

| | | | | |
|---|---|---|---|---|
| 2002/0078004 A1* | 6/2002 | Ambrosini et al. | ............... | 707/1 |
| 2002/0174256 A1* | 11/2002 | Bonilla et al. | ............... | 709/310 |
| 2003/0107590 A1* | 6/2003 | Levillain et al. | ............... | 345/736 |
| 2003/0220879 A1* | 11/2003 | Gaughan et al. | ................ | 705/51 |
| 2006/0206507 A1* | 9/2006 | Dahbour | ........................ | 707/100 |
| 2007/0239859 A1* | 10/2007 | Wilkinson et al. | ............ | 709/220 |
| 2008/0060057 A1* | 3/2008 | Barchi et al. | ....................... | 726/3 |
| 2008/0134325 A1* | 6/2008 | Kim et al. | ........................ | 726/21 |
| 2009/0063505 A1* | 3/2009 | Kinder | ............................ | 707/10 |
| 2009/0300596 A1* | 12/2009 | Tyhurst et al. | ................. | 717/173 |
| 2010/0031312 A1* | 2/2010 | Dixit | ................................ | 726/2 |
| 2010/0191781 A1* | 7/2010 | Gorthi et al. | .................. | 707/822 |
| 2011/0213966 A1* | 9/2011 | Fu et al. | ........................ | 713/158 |
| 2011/0239275 A1* | 9/2011 | De Peuter et al. | ................ | 726/4 |

OTHER PUBLICATIONS

Mar. 30, 2008, Deploying OpenLDAP under FreeBSD 7.0, Non literature public article.*
Oracle Fusion Middleware Administrator's Guide for Oracle Authentication Services for Operating Systems, Jul. 2010.*

* cited by examiner

*Primary Examiner* — Ashok Patel
*Assistant Examiner* — Gary Gracia
(74) *Attorney, Agent, or Firm* — Lowenstein Sandler LLP (57) ABSTRACT

A method and apparatus for integrating Sudo rules into a Lightweight Directory Access Protocol (LDAP) repository. An LDAP directory server receives a request to add a sudo rule to the LDAP repository. The sudo rule defines at least one sudo command and one or more entities associated with the execution of the sudo command. The LDAP directory server creates an LDAP entry for the sudo rule, and links in the LDAP entry of the sudo rule an LDAP entry of the sudo command and LDAP entries of the entities associated with the execution of the sudo command.

21 Claims, 5 Drawing Sheets

INTEGRATING SUDO RULES WITH ENTITIES REPRESENTED IN AN LDAP DIRECTORY

TECHNICAL FIELD

Embodiments of the present invention relate to a Lightweight Directory Access Protocol (LDAP), and more specifically to integrating sudo rules with entities represented in an LDAP directory.

BACKGROUND

Sudo rules are utilized for allowing a permitted user to execute a command as the superuser or another user. Sudo is an abbreviation for "substitute user do" (as in, do a command with another user's privileges). The sudo program (e.g., a sudo implementation or any program which allows a command to be executed using another user's privileges) requires that users authenticate themselves with a selected password. Once a user has been authenticated, a timestamp is recorded and the user may then use the sudo program without a password for a selected period of time (e.g., five minutes by default). The sudo program further determines whether the user is authorized to run a sudo command. The sudo program can record both successful and unsuccessful attempts or errors to syslog, a log file, or both.

Sudo rules are typically specified in a configuration file ("sudoers" file), which has to be manually created and updated and has to be read in its entirety each time the sudo program receives a request to execute a sudo command. In addition, sudo rules can be stored in an LDAP directory if a special sudo schema is installed on the LDAP server. However, sudo rule entries conforming to the sudo schema are disjoint from entries of other entities managed by the LDAP directory. For example, LDAP entries for a sudo rule specifying a sudo command that is permitted to be executed by a certain group of users are not linked in any way to LDAP entries including detailed information for the same group of users. A change in this group's membership may result in inconsistent LDAP entries, thereby significantly jeopardizing the reliability of the entire system. LDAP directory servers generally use netgroup entries to group hosts together. The netgroup entries may not provide an efficient method for aggregating hosts. In addition, the relationship between a sudo rule entry and other LDAP entries (e.g., users, groups, etc.) is generally defined by name. If the names of the other LDAP entries are changed, then the rule will not apply to the changed LDAP entries due to the name change. Furthermore, the commands which are executed by the rule are generally specified individually in each rule. For example, if a rule uses five different commands, each of the five different commands must be specified in the rule.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for integrating sudo rules into an Lightweight Directory Access Protocol (LDAP) repository that is managed by an LDAP directory server. The LDAP repository has an LDAP schema that facilitates the integration of sudo rules with other entities represented in the LDAP repository. In one embodiment, the LDAP directory server receives a request to add a sudo rule to the LDAP repository. The sudo rule defines at least one sudo command (e.g., a sudo command or a group of sudo commands) and one or more entities associated with the execution of the sudo command. The entities may include, for example, one or more users, one or more groups of users, one or more hosts, one or more groups of hosts, or one or more netgroups. Upon receiving the request to add the sudo rule, the LDAP directory server creates an LDAP entry for the sudo rule, which links an LDAP entry for the sudo command with LDAP entries of the entities associated with the execution of the sudo command. In some embodiments, the LDAP entry for the sudo rule links together entries for a sudo command (or a group of sudo commands), entries for users (or user groups), and entries for hosts (or groups of hosts). In one embodiment, the LDAP entries for the sudo command (or group of sudo commands), the users (or user groups) and the hosts (or groups of hosts) may be previously created and stored in a memory.

Rather than using an independent, self-contained schema for sudo rules, embodiments of the invention implement an integrated schema that combines sudo rules with other entities managed by the LDAP directory server. As a result, management of LDAP data is simplified and reliability of LDAP services is improved. In one embodiment, the single schema may allow for better management capabilities and referential integrity. For example, the schema may use distinguished names (DN) based on unique identifiers to reference entries. This may allow a reference to an entry to remain intact even if the attributes or the name of the entry is changed. In another embodiment, the schema may allow commands to be grouped together and may allow a sudo rule entry to reference the group of commands, rather than having a reference to each of the commands in the group of commands. In a further embodiment, the schema may allow the use of host and host group objects as, for example, used by an IPA server, rather than the netgroup entries used by the LDAP directory server. This may allow for more efficient grouping and aggregation of hosts.

In one embodiment, a compatibility plugin may be used by one or more sudo clients to use the single schema. In another embodiment, the sudo client may communicate with an authentication service (e.g., system security services daemon (SSSD)), which may cache data from the LDAP server when the sudo client is online to allow offline operations.

In the following description, numerous details are set forth. It will be apparent, however, to one skilled in the art, that the present invention may be practiced without these specific details.

Figure 1:
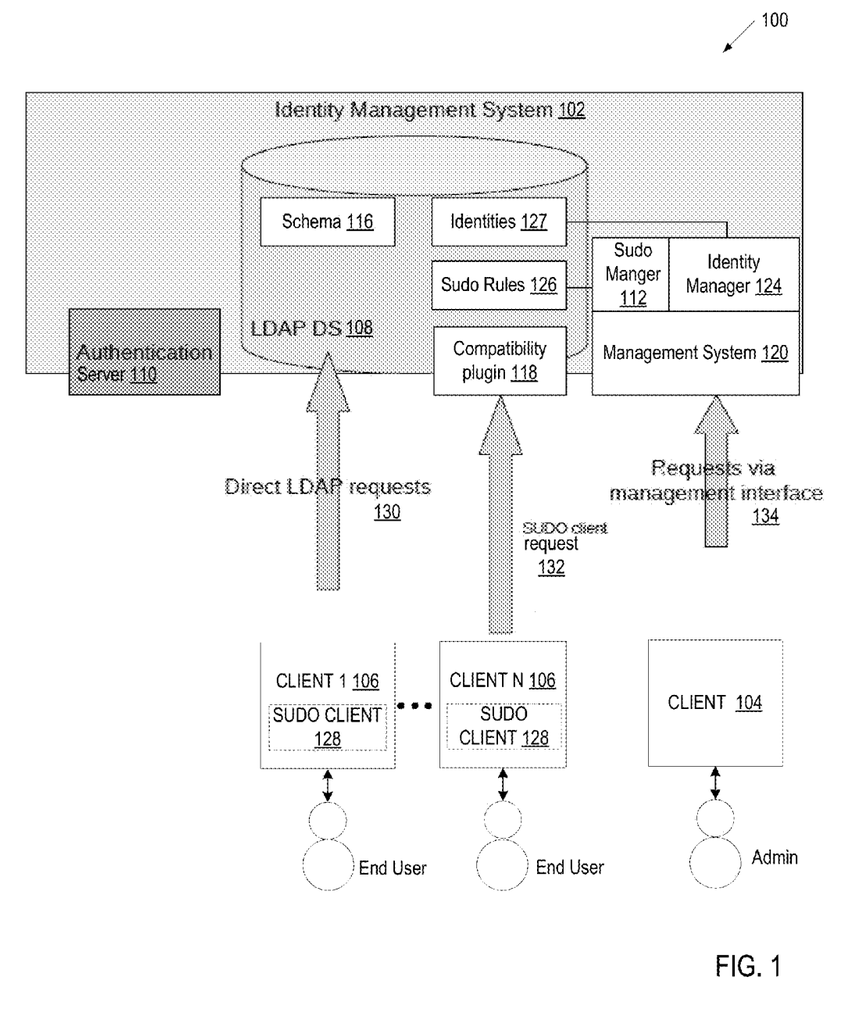
FIG. 1 illustrates an exemplary network architecture in which embodiments of the present invention may be implemented.

FIG. 1 illustrates an exemplary network architecture 100 in which embodiments of the present invention may operate. The network architecture 100 may include client devices 104 and 106 coupled to an identity management system 102 via a network. The client devices 104 and 106 may be, for example, personal computers (PCs), mobile phones, palm-sized computing devices, personal digital assistants (PDAs), etc. The network may be a public network (e.g., Internet) or a private network (e.g., a local area network (LAN)). The client devices 106 may include user devices and/or application servers hosting various applications that operate as clients in communications with the identity management system 102. The client devices 106 may communicate with the identity management system 102 directly using LDAP or via an intermediary service, e.g., a web server (not shown).

The identity management system 102 may include one or more server computers, desktop computers, etc. The identity management system 102 may include an authentication server 110 (e.g., Kerberos domain controller (KDC)), a directory server 108 and a management subsystem 120. The authentication server 110 is responsible for authenticating hosts (client devices 106) and/or their users (users of client devices 106) prior to allowing access to the directory server 108.

The LDAP directory server 108 maintains an LDAP repository residing on one or more mass storage devices, such as magnetic or optical storage based disks, solid-state drives, tapes or hard drives. The LDAP repository may contain a tree of data entries. The structure of the entries is specified in the schema 116 of the LDAP repository, which may reside independently or inside the LDAP repository. For example, the schema may be included in the LDAP repository as a collection of LDAP repository entries rooted at the base DN cn=schema. The schema may define object classes and attributes associated with each object class. Each entry in the LDAP repository has an objectClass attribute, containing one or more classes defined in the schema. For each class an entry belongs to, the schema defines what kind of object the entry may represent (e.g., a person, organization or domain). Depending on the class, an entry may have a set of mandatory attributes and a set of optional attributes. For example, an entry that belongs to the "person" class would contain mandatory attributes such as surname ("sn") and common name ("cn"), and optional attributes such as "userPassword", "telephoneNumber", and others.

In one embodiment, the directory server 108 may comprise a referential integrity plugin (not shown in the figures). The referential integrity plugin may be used to maintain referential integrity between entries when names and/or other attributes of the entries are changed. For example, if a user entry is named "Robert" and the name is changed to "Bob," the referential integrity plugin may be used to maintain the references to the changed user entry from other entries (e.g., maintain the reference to the user entry from a sudo rule entry, after the name change).

Clients 106 may request data from the LDAP directory server 108 by submitting requests using the LDAP protocol (e.g., direct LDAP requests 130). Some or all of the client devices 106 may host a sudo client (sudo utility) 128 that allows users to execute sudo commands. Upon receiving a sudo command from a user, the sudo client 128 authenticates the user. Once a user has been authenticated, the sudo client 128 updates a timestamp and allows the user to use sudo without a password for a selected period of time (e.g., five minutes by default). The sudo client 128 further submits a request 132 to the LDAP directory server 108 to determine whether the user is authorized to run a sudo command based on sudo rules 126 stored in the LDAP repository. The sudo client 128 expects sudo rules to be stored in the LDAP repository in accordance with a standard sudo schema, which is a separate schema designated for sudo. However, the use of such a sudo schema results in sudo rule entries being disjoint from entries of other entities managed by the LDAP directory server 108.

Embodiments of the present invention avoid the above problem by maintaining a schema 116 that integrates sudo rules 126 with identities 127 managed by the directory server 108. The identities 127 may include, for example, users, user groups, hosts, host groups, netgroups (a combination of users and hosts under an organized name), sudo commands, groups of sudo commands, etc. The schema 116 may include classes for users, user groups, hosts, host groups and netgroups. In addition, the schema may include a class for associating users with hosts. For example, based on the association, a user may be tied to a target machine to be accessed, or a source machine from which the user is allowed to access the target machine, or a service that the user is using to access the target machine, etc. Further, the schema 116 may include classes related to sudo such as a class for a sudo command, a class for a group of sudo commands, and a class for sudo rules associating users or groups of users and hosts or groups of hosts with sudo commands. An exemplary schema integrating sudo rules 126 with identities 127 will be discussed in more detail below.

By utilizing the schema 116, the directory server 108 no longer needs to have multiple schemas. For example, the directory server 10 may have one schema representing entities (e.g., users and hosts) and relationships between the entities, and another schema representing sudo commands and entities (e.g., users and hosts) and relationships between the sudo commands and the entities. Instead the single schema 116 is used to maintain both the sudo rules and the entities and to express all the necessary relationships between them. As a result, the LDAP repository 114 has interconnected entries that can be easily updated and accessed.

As discussed above, the sudo client 128 expects sudo rules to be stored in the LDAP repository in accordance with a standard sudo schema, which is different from schema 116. In order to facilitate communication between the sudo client 128 and the directory server 108, the directory server 108 includes a compatibility module or plugin 118 that is configured to transform sudo-related data retrieved from the LDAP repository to the format expected or understandable by the sudo client 128. In addition, when the client 106 submits a sudo client request 132 to directory server 108 for sudo-related data, the compatibility plugin 118 may transform the request into the format that conforms to the schema 116. In one embodiment, the directory server 108 may include multiple compatibility modules or plugins 118. Each of the multiple compatibility plugins 118 may be facilitate communications between different sudo clients 128 (e.g., different implementations of a sudo program) and the directory server 108.

In one embodiment, the identity management system 102 includes a management subsystem 120 that is responsible for managing entries maintained by the LDAP directory server 108. In particular, the management subsystem 120 may include a sudo manager 112 and an identity manager 124. The identity manager 124 configures identities 127 based on requests 134 of client(s) 104 operated by a system administrator, a database administrator or the like. For example, an administrator may submit a request to associate a specific group of users with a certain group of hosts, and the identity manager 124 may add a new LDAP entry linking the specific group of users with the certain group of hosts. The sudo manager 112 configures sudo rules 126 based on requests 134 of client(s) 104. For example, an administrator may submit a request to link a specific sudo command with a certain group of users and a certain group of hosts, and the sudo manager 112 may add a new LDAP entry for a sudo rule 126 linking the specific sudo command with the certain group of users and the certain group of hosts. In one embodiment, the management subsystem 120 provides a management user interface allowing users of client device(s) 104 to provide input for configuring sudo rules 126 and/or identities 127. It should be noted that the client 104 may not only communicate with the management subsystem 120 but also with the LDAP directory server 108 and host a sudo client 128 to submit requests 132 as discussed in more detail above.

Figure 2:
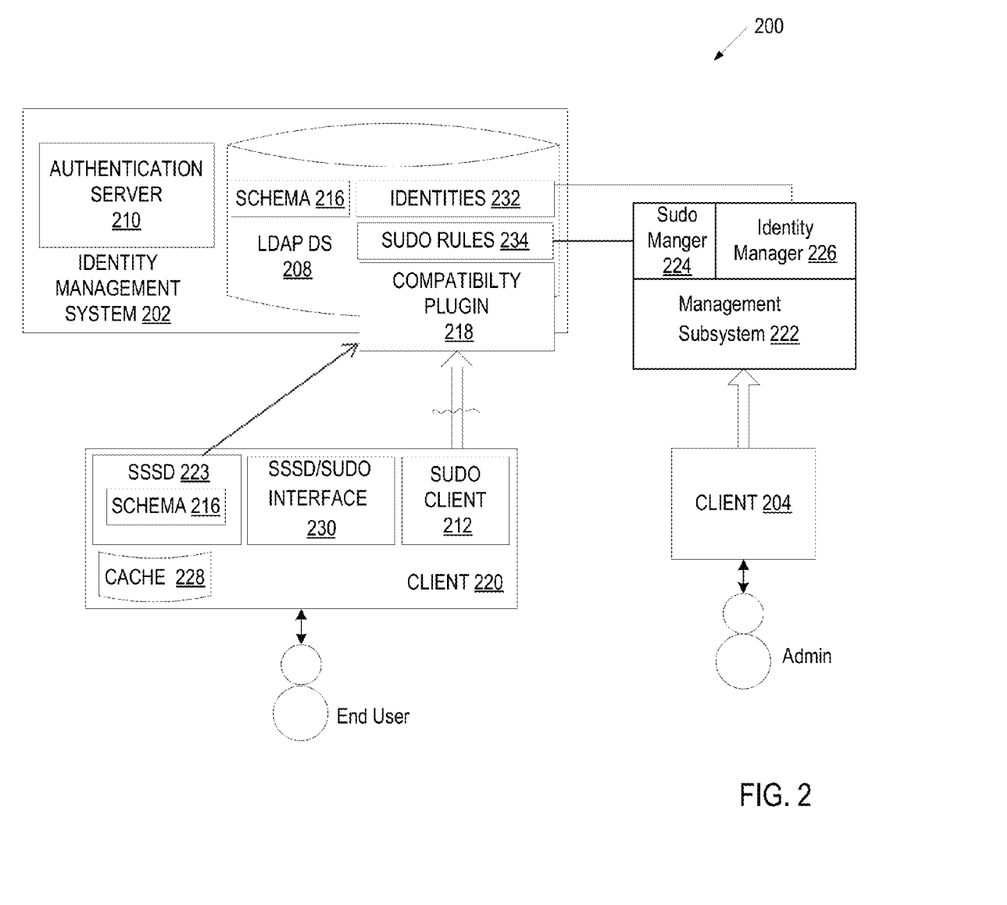
FIG. 2 illustrates another exemplary network architecture in which embodiments of the present invention may be implemented.

FIG. 2 illustrates another exemplary network architecture 200 in which embodiments of the present invention may operate. The network architecture 200 includes client devices 220 and 204 coupled to identity management system 202 via a network, which may be a public network (e.g., Internet) or a private network (e.g., a LAN). The client devices 220 may be, for example, personal computers (PCs), mobile phones, palm-sized computing devices, personal digital assistants (PDAs), etc. The client devices 220 may include user devices and/or application servers hosting various applications that operate as clients in communications with the identity management system 202. The client device 204 may be an administrator console or any other computing device operated by a system administrator, a directory server administrator or any other individual who may have higher privileges than an end user.

The identity management system 202 may include one or more server computers, desktop computers, etc. The identity management system 202 may include an authentication server 210, a directory server 208 and a management subsystem 222. When client devices 220 are connected to the identity management system 202, the authentication server 210 is responsible for authenticating hosts (client devices 220) and/or their users (users of client devices 220) prior to allowing access to the directory server 208. The LDAP directory server 208 maintains an LDAP repository residing on one or more mass storage devices, such as magnetic or optical storage based disks, solid-state drives, tapes or hard drives. The LDAP repository may contain a tree of data entries. The structure of the entries is specified in the schema 216 of the LDAP repository, which may reside independently or inside the LDAP repository. The schema 216 of the LDAP repository integrates sudo rules 234 with identities 232 managed by the directory server 208, similarly to schema 116 discussed above. When client devices 220 are connected to the identity management system 202, interactions between the client devices 220 and the LDAP directory server 208 are similar to those described above in connection with client devices 106 and the LDAP directory server 108. For example, clients 220 may submit direct LDAP request and/or sudo client requests to the LDAP directory server 208. Sudo client requests may be submitted by sudo clients 212 hosted by client devices 220 and transformed by the compatibility plugin 218 in accordance with the schema 216.

Further, similarly to the management subsystem 120, the management subsystem 222 may include a sudo manager 224 and an identity manager 226. The identity manager 226 configures identities 232 based on requests of client(s) 204. The sudo manager 224 configures sudo rules 234 based on requests of client(s) 204.

As opposed to FIG. 1, the network architecture 200 may allow clients 220 to work with LDAP repository data offline when there is no connectivity between the LDAP directory server 208 and the client 220. In addition to a sudo client 212, the client device 220 may also host an authentication service (e.g., system security services daemon (SSSD) 223) that authenticates users requesting sudo services. In one embodiment, the SSSD 223 periodically caches data from the LDAP repository 214 and stores it in cache 228 using the format defined by the schema 216. When there is no connectivity between the client device 220 and the identity management system 202, the sudo client 212 may request sudo data from the SSSD 223, which may retrieve the requested data from the cache 228, and transform it into the format expected by the sudo client 212 using SSSD/SUDO interface 230, which functions similarly to the compatibility plugin 218. In one embodiment, client 220 may include multiple SSSD/SUDO interfaces 230 and each SSSD/SUDO interface 230 may communicate with the SSSD 223 and a different sudo client 212 (e.g., different implementations of the sudo program). The SSSD 223 then passes the resulting data to the sudo client 212. In one embodiment, even when there is a connection between the client device 220 and the identity management system 202, the sudo client 212 may first request sudo data from the SSSD 223. If the SSSD 223 does not return the requested data or indicates that the requested data in the cache 228 is not up-to-date, then the sudo client 212 sends a query to the identity management system 202. Otherwise, the sudo client 212 uses the sudo data provided by the SSSD 223. In another embodiment, even when there is a connection between the client device 220 and the identity management system 202, the sudo client 212 may always request sudo data from the SSSD 223. If the SSSD 223 does not return the requested data from cache or indicates that the requested data in the cache 228 is not up-to-date, then the sudo client 212 will wait for SSSD 223 to retrieve the necessary data from the server. If this operation takes too much time (e.g., more than a threshold), the SSSD/SUDO interface 230 may time out and return an error to the sudo client 212 that may be interpreted by the sudo client 212 as indicating that the command is not allowed. The SSSD 223 may be able to complete the data retrieval operation at a later time (e.g., when SUDO client 212 is invoked next time), and at that time the data may be cached and up-to-date.

An exemplary improved LDAP schema that integrates sudo rules with other LDAP entities will now be discussed in more detail. The improved LDAP schema includes entity objects and sudo command objects and is able to express various sudo rules. For instance, a sudo rule may require that an identity A on host B execute set C as identity D, where the identities A and D can be expressed as a user, a group of users and/or a netgroup, host B can be expressed as a host, a group of hosts and/or a netgroup, and set C is a command and/or a group of commands.

A standard sudo schema in the OpenLDAP format understandable by sudo client 128 or 212 includes the following objects: sudoUser, sudoHost, sudoCommand, sudoRunAs, sudoOption, sudoRunAsUser, sudoRunAsGroup. In addition, the standard sudo schema includes "Sudoer Entries" object class with the above optional attributes.

In order to address the above requirements of the standard sudo schema, the improved LDAP schema uses existing objects that include, for example, a user attribute, a user category attribute, a host attribute, a host category attribute, an association class for associating users with hosts, and an enabled flag attribute to indicate whether the sudo rule is enabled or disabled. In one embodiment, the association class may be used to link different types of objects together. The association class may be extended and used as a rule object class (e.g., to represent sudo rule entries) and the rule object class may inherit the ability to link different types of objects together (e.g., from the association class). In addition, the improved LDAP schema contains new objects that include, for example, a sudo command class, a sudo command group class, a sudo command attribute, an allow command attribute, a deny command attribute, a command category, a sudo run as attribute, a sudo run as group attribute, and a sudo association class that includes a number of optional attributes. Some of the optional attributes of the sudo association class include an allow command attribute, a deny command attribute, a command category, a sudo run as attribute, and a sudo run as group attribute.

In one embodiment, a general association class may be defined as follows:

```
objectClass association:
MUST:
    cn: Name of the object
MAY:
    user: List of distinguished names of users and groups of the
        managed domain
    userCategory: Application specific keyword (e.g ALL to match all
        users)
    host: List of distinguished names of hosts and host groups of the
        managed domain
    hostCategory: Application specific keyword (e.g ALL to match all
        hosts)
    EnabledFlag: toggle whether the object should be considered in the
evaluation
    description: explains the object and its usage
```

In another embodiment, a class for a sudo rule which inherits from the association class may be defined as follows:

```
objectclass sudorule
MUST:
MAY:
    externalUser: List of names of users not members of the managed
        domain
    externalHost: List of host names not members of the managed
        domain
    hostSubnetMask: IP subnet mask to include all hosts in this subnet
    allowCmd: List of distinguished name of sudo commands and
        groups of sudo commands which should be allowed
    denyCmd: List of distinguished name of sudo commands and
        groups of sudo commands which should be denied
    cmdCategory: Application specific keyword to match sudo
        commands (e.g. ALL to match any command)
    sudoOpt: List of sudo options (e.g. rootpw, env_keep etc.)
    sudoRunAs: List of distinguished names of the users from the
        mananged domain the command(s) may be run as
    sudoRunAsExtUser: List of names of users not from the mananged
        domain the command(s) may be run as
    sudoRunAsUserCategory: Application specific keyword to match
        RunAs users
    sudoRunAsGroup: List of distinguished names of groups from the
        mananged domain the command(s) may be run as
    sudoRunAsExtGroup: List of names of groups not from the
        mananged domain the command(s) may be run as
    sudoRunAsGroupCategory: Application specific keyword to match
RunAs groups.
```

In another embodiment, a sudo rule object which may allow the managed users user1 and user2 and all users of the managed group group1 to run the command referenced by cn=reboot,ou=sudocommands,dc=example,dc=com on all hosts may be defined as follows:

```
dn: cn=sudorule_example,ou=sudorules,dc=example,dc=com
objectClass: association
objectClass: sudoRule
cn: sudorule_example
description: Example of a sudorule object
EnabledFlag: TRUE
user: cn=user1,ou=users,dc=example,dc=com
user: cn=user2,ou=users,dc=example,dc=com
user: cn=group1,ou=groups,dc=example,dc=com
```

-continued

```
hostCategory: ALL
externalUser: dbadmin
allowCmd: cn=reboot,ou=sudocommands,dc=example,dc=com
sudoOpt: requiretty
sudoRunAsExtUser: root
```

It should be noted that the list of the existing and new objects in the LDAP schema is provided for illustration only and should not limit the embodiments of the invention in any way. Various other existing and new objects can be included in the LDAP schema in addition or in place of the above-referenced objects without loss of generality.

Figure 3:
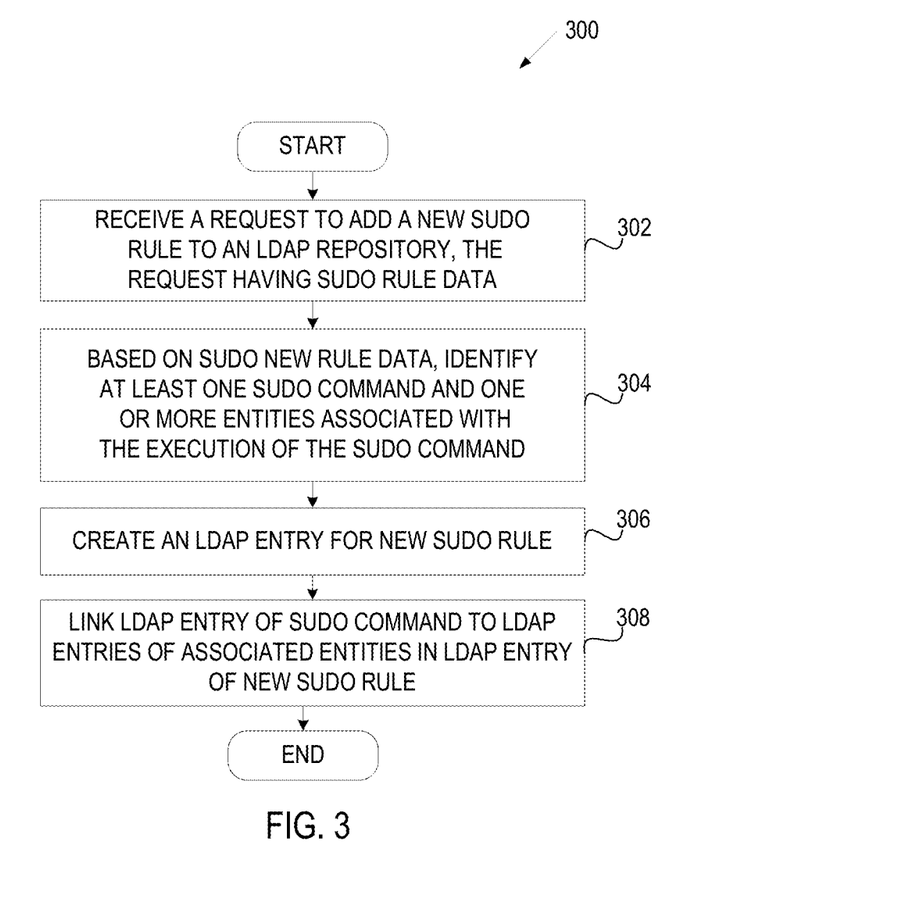
FIG. 3 is a flow diagram of one embodiment of a method for adding sudo rules to an LDAP repository.

FIG. 3 is a flow diagram of one embodiment of a method 300 for adding a sudo rule to an LDAP repository. The method may be performed by processing logic that may comprise hardware (e.g., circuitry, dedicated logic, programmable logic, microcode, etc.), software (such as instructions run on a processing device), or a combination thereof. In one embodiment, method 300 is performed by the LDAP directory server 108 of FIG. 1.

Referring to FIG. 3, method 300 begins with the LDAP directory server receiving a request to add a new sudo rule to the LDAP repository (block 302). The request may be submitted by a system administrator or any other user. The request may include sudo rule data specifying a sudo command or a group of sudo commands, and a user or a group of users allowed or disallowed to execute the sudo command or the group of sudo commands. In addition, the sudo rule data may specify a host or a group of hosts associated with the user(s) and a user or a group of users that the sudo command(s) is allowed to be executed as.

Based on the sudo rule data, the LDAP directory server identifies one or more sudo commands and entities associated with the execution of the sudo commands (block 304). As discussed above, the associated entities can include users, user groups, hosts, host groups and netgroups.

At block 306, the LDAP directory server creates an LDAP entry for a new sudo rule using the sudo rule class. At block 308, the LDAP directory server links an LDAP entry of the sudo command(s) to LDAP entries of the associated entities in the LDAP entry of the new sudo rule. In one embodiment, the LDAP directory server provides the linking by adding the attributes identifying the sudo command(s) and the associated entities to the LDAP entry of the new sudo rule. In one embodiment, if the LDAP repository does not include an entry for a sudo command, the LDAP directory server first created an LDAP entry for a missing sudo command or entity and then adds the attribute identifying the command to the sudo rule entry.

Subsequently, if any of the entities associated with the execution of a sudo command (e.g., the membership in the group of users permitted to execute a sudo command) changes, the LDAP directory server updates an LDAP entry for the corresponding entity without making any changes to an LDAP entry of the sudo rule. Similarly, if a characteristic (e.g., description) of a sudo command changes, the LDAP directory server will modify an LDAP entry for the sudo command without making any changes to the LDAP entry of the sudo rule. In one embodiment, upon receiving a request to delete a sudo rule from the LDAP repository, the LDAP directory server marks the sudo rule disabled in the LDAP entry. In another embodiment, upon receiving a request to delete a sudo rule from the LDAP repository, the LDAP directory server may delete the rule, rather than marking it disabled.

Figure 4:
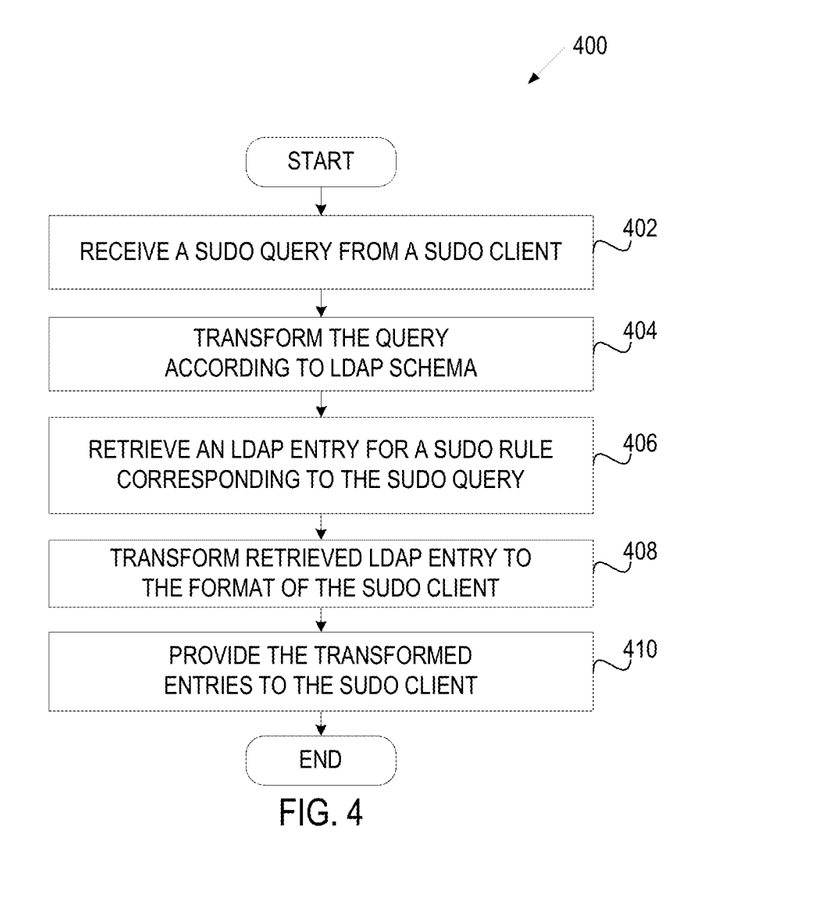
FIG. 4 is a flow diagram of one embodiment of a method for handling a sudo query.

FIG. 4 is a flow diagram of one embodiment of a method 400 for handling a sudo query. The method may be performed by processing logic that may comprise hardware (e.g., circuitry, dedicated logic, programmable logic, microcode, etc.), software (such as instructions run on a processing device), or a combination thereof. In one embodiment, method 400 is performed by the LDAP directory server 108 of FIG. 1.

Referring to FIG. 4, method 400 begins with the LDAP directory server receiving a sudo query from a sudo client. The sudo query may identify a sudo command or a group of sudo commands, a user and a host (block 402). In one embodiment, the sudo query may comprise a standard query used by sudo client. At block 404, the LDAP directory server transforms the query according to the LDAP schema. At block 406, the LDAP directory server retrieves an LDAP entry for a rule corresponding to the sudo query (e.g., a rule reflecting a combination of the specified sudo command, user and host).

At block 408, the LDAP directory server transforms the retrieved LDAP entry to the format expected by the sudo client. At block 410, the LDAP directory server provides the transformed entries to the sudo client.

Figure 5:
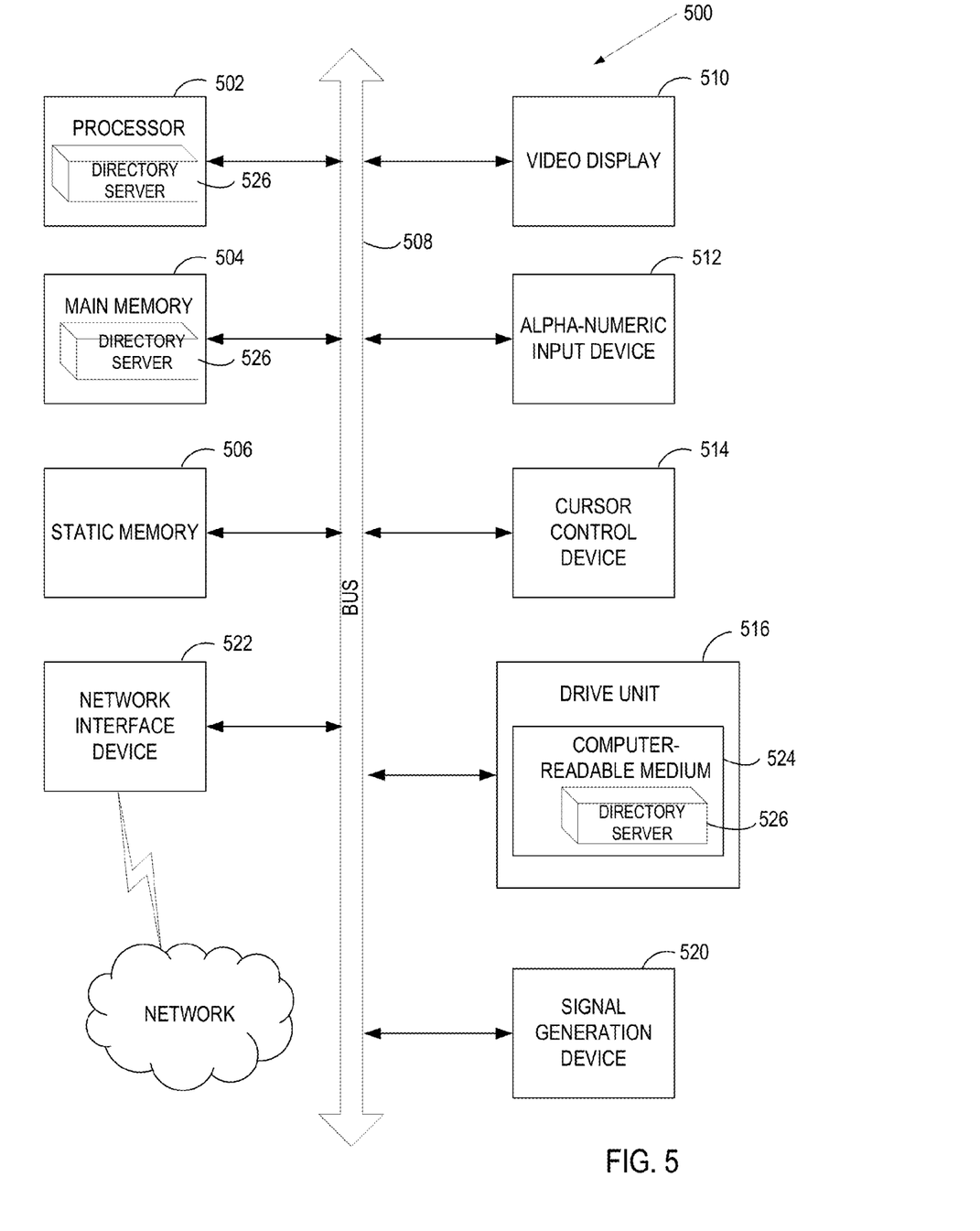
FIG. 5 illustrates a block diagram of an exemplary computer system hosting an identity management system.

FIG. 5 illustrates a diagrammatic representation of a machine in the exemplary form of a computer system 500 hosting a managed entry subsystem. Within computer system 500, a set of instructions for causing the machine to perform any one or more of the methodologies discussed herein may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a drive unit 516, which communicate with each other via a bus 508. Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the directory server 526 for performing the operations and steps discussed herein. The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). The drive unit 516 may include a machine-readable storage medium 524 (also known as a computer-readable medium) on which is stored one or more sets of instructions or software of the directory server 526 embodying any one or more of the methodologies or functions described herein. The software 526 may also reside, completely or at least partially, within the main memory 504 and/or within the processing device 502 during execution thereof by the computer system 500, the main memory 504 and the processing device 502 also constituting machine-readable storage media. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "creating" or "linking" or "transforming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method for a Light Weight Directory Access Protocol (LDAP) directory server, the method comprising:
receiving a request to add a new sudo (substitute user do) rule of a plurality of sudo rules to an LDAP repository, the LDAP repository having an LDAP schema facilitating an integration of the plurality of sudo rules with a plurality of entities represented in the LDAP repository using a plurality of object classes each associated with a set of attributes, the new sudo rule defining at least one sudo command and one or more entities of the plurality of entities for executing the at least one sudo command via one or more sudo clients coupled to the LDAP directory server via a network, the new sudo rule permitting the one or more entities to execute, via the one or more sudo clients, the at least one sudo command with privileges of one or more other entities of the plurality of entities;
identifying an LDAP entry of the at least one sudo command, the LDAP entry of the at least one sudo command entry having attributes associated with a sudo command object class of the plurality of objects classes of the LDAP schema;
identifying one or more LDAP entries of the one or more entities associated with the execution of the at least one sudo command via the respective sudo clients, each LDAP entry of the one or more entities having attributes associated with an entity object class of the plurality of objects classes of the LDAP schema;
creating, by a processing device, an LDAP entry for the new sudo rule using a sudo rule object class of the plurality of objects classes of the LDAP schema;
linking, in the LDAP entry of the new sudo rule, the LDAP entry of the at least one sudo command with the one or more LDAP entries of the one or more entities associated with the execution of the at least one sudo command via the respective sudo clients; and
upon receiving a request to delete the new sudo rule from the LDAP repository, marking the new sudo rule disabled in the LDAP entry of the new sudo rule.

2. The method of claim 1 wherein the LDAP entry of the at least one sudo command and the LDAP entries of the one or more entities for executing the at least one sudo command existed in the LDAP repository prior to the received request.

3. The method of claim 1 further comprising:
receiving a query pertaining to the new sudo rule from a sudo client of the one or more sudo clients;
transforming the query according to the LDAP schema;
retrieving an LDAP entry corresponding to the received query from the LDAP repository;
transforming the retrieved data to a format of the sudo client; and
providing the transformed data to the sudo client for execution.

4. The method of claim 1 wherein the at least one sudo command is a single sudo command or a group of sudo commands.

5. The method of claim 1 wherein the one or more entities for executing the at least one sudo command comprise one or more of a user, a group of users, a host, a group of hosts, or a netgroup.

6. The method of claim 1 wherein the one or more entities for executing the at least one sudo command comprises one or more of an entity allowed to execute the at least one sudo command, an entity disallowed to execute the at least one sudo command, or an entity on which behalf the at least one sudo command is allowed to be executed.

7. The method of claim 1 wherein the sudo command object class is an object class for a sudo command or an object class for a group of sudo commands, the entity object class is any one of an object class for a user, an object class for a group of users, an object class for a host, an object class for a group of hosts, or an object class for a netgroup.

8. The method of claim 1, wherein the sudo client communicates with a system security services daemon (SSSD) when the sudo client does not have a connection with the LDAP server, the SSSD periodically caching contents of the LDAP repository.

9. The method of claim 1 further comprising:
receiving a client request to change one of the one or more entities for executing the at least one sudo command; and
modifying an LDAP entry of the requested entity without modifying the LDAP entry for the at least one sudo command.

10. A system for a Light Weight Directory Access Protocol (LDAP) directory server, the system comprising:
a memory;
a processor, coupled to the memory, to:
receive a request to add a new sudo (substitute user do) rule of a plurality of sudo rules to an LDAP repository, the LDAP repository having an LDAP schema facilitating an integration of the plurality of sudo rules with a plurality of entities represented in the LDAP repository using a plurality of object classes each associated with a set of attributes, the sudo rule defining at least one sudo command and one or more entities of the plurality of entities for executing the at least one sudo command via one or more sudo clients coupled to the LDAP server via a network, the new sudo rule permitting the one or more entities to execute, via the one or more sudo clients, the at least one sudo command with privileges of one or more other entities of the plurality of entities;
identify an LDAP entry of the at least one sudo command, the LDAP entry of the at least one sudo command entry having attributes associated with a sudo command object class of the plurality of objects classes of the LDAP schema;
identify one or more LDAP entries of the one or more entities associated with the execution of the at least one sudo command via the respective sudo clients, each LDAP entry of the one or more entities having attributes associated with an entity object class of the plurality of objects classes of the LDAP schema;
create an LDAP entry for the new sudo rule using a sudo rule object class of the plurality of objects classes of the LDAP schema;
link, in the LDAP entry of the new sudo rule, the LDAP entry of the at least one sudo command with the one or more LDAP entries of the one or more entities associated with the execution of the at least one sudo command via the respective sudo clients; and upon receiving a request to delete the new sudo rule from the LDAP repository, mark the new sudo rule disabled in the LDAP entry of the new sudo rule.

11. The system of claim 10 wherein the LDAP entry of the at least one sudo command and the LDAP entries of the one or more entities for executing the at least one sudo command existed in the LDAP repository prior to the received request.

12. The system of claim 10, wherein the processor is further configured to:
receive a query pertaining to the new sudo rule from the sudo client; transform the query according to the LDAP schema;
retrieve an LDAP entry corresponding to the received query from the LDAP repository;
transform the retrieved data to a format of the sudo client; and
provide the transformed data to the sudo client for execution.

13. The system of claim 10 wherein the one or more entities for executing the at least one sudo command comprise one or more of a user, a group of users, a host, a group of hosts, or a netgroup.

14. The system of claim 10 wherein the one or more entities for executing the at least one sudo command comprises one or more of an entity allowed to execute the at least one sudo command, an entity disallowed to execute the at least one sudo command, or an entity on which behalf the at least one sudo command is allowed to be executed.

15. The system of claim 10 wherein the sudo command object class is an object class for a sudo command or an object class for a group of sudo commands, the entity object class is any one of an object class for a user, an object class for a group of users, an object class for a host, an object class for a group of hosts, or an object class for a netgroup.

16. The system of claim 10 wherein the sudo client communicates with a system security services daemon (SSSD), wherein the SSSD periodically caches contents of the LDAP repository, and wherein the cached contents are used by the sudo client when the sudo client does not have a connection with the LDAP server or when the sudo client requires data within the cached contents.

17. A non-transitory computer readable storage medium storing instructions which when executed cause a~processing device~stem to perform a method for a Light Weight Directory Access Protocol (LDAP) directory server, the method comprising:
receiving a request to add a new sudo (substitute user do) rule of a plurality of sudo rules to an LDAP repository, the LDAP repository having an LDAP schema facilitating an integration of the plurality of sudo rules with a plurality of entities represented in the LDAP repository using a plurality of object classes each associated with a set of attributes, the new sudo rule defining at least one sudo command and one or more entities of the plurality of entities for executing the at least one sudo command via one or more sudo clients coupled to the LDAP directory server via a network, the new sudo rule permitting the one or more entities to execute, via the one or more sudo clients, the at least one sudo command with privileges of one or more other entities of the plurality of entities;
identifying an LDAP entry of the at least one sudo command, the LDAP entry of the at least one sudo command entry having attributes associated with a sudo command object class of the plurality of objects classes of the LDAP schema;
identifying one or more LDAP entries of the one or more entities associated with the execution of the at least one sudo command via the respective sudo clients, each LDAP entry of the one or more entities having attributes associated with an entity object class of the plurality of objects classes of the LDAP schema;
creating, by the processing device, an LDAP entry for the new sudo rule using a sudo rule object class of the plurality of objects classes of the LDAP schema;
linking, in the LDAP entry of the new sudo rule, the LDAP entry of the at least one sudo command with the one or more LDAP entries of the one or more entities associated with the execution of the at least one sudo command via the respective sudo clients; and
upon receiving a request to delete the new sudo rule from the LDAP repository, marking the new sudo rule disabled in the LDAP entry of the new sudo rule.

18. The non-transitory computer readable storage medium of claim 17 wherein the LDAP entry of the at least one sudo command and the LDAP entries of the one or more entities for executing the at least one sudo command existed in the LDAP repository prior to the received request.

19. The non-transitory computer readable storage medium of claim 17 wherein the one or more entities for executing the at least one sudo command comprise one or more of a user, a group of users, a host, a group of hosts, or a netgroup.

20. The non-transitory computer readable storage medium of claim 17, wherein the one or more entities for executing the at least one sudo command comprises one or more of an entity allowed to execute the at least one sudo command, an entity disallowed to execute the at least one sudo command, or an entity on which behalf the at least one sudo command is allowed to be executed.

21. The non-transitory computer readable storage medium of claim 17 wherein the sudo command object class is an object class for a sudo command or an object class for a group of sudo commands, the entity object class is any one of an object class for a user, an object class for a group of users, an object class for a host, an object class for a group of hosts, or an object class for a netgroup.

* * * * *